US010055362B2

(12) United States Patent
Kwon et al.

(10) Patent No.: US 10,055,362 B2
(45) Date of Patent: Aug. 21, 2018

(54) APPARATUS AND METHOD FOR PROVIDING APPLICATION AUTO-INSTALL FUNCTION IN DIGITAL DEVICE

(75) Inventors: Joon-Hwan Kwon, Suwon-si (KR); Gyu-Tae Park, Seocho-gu (KR); Eun-Young Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 18 days.

(21) Appl. No.: 13/364,218

(22) Filed: Feb. 1, 2012

(65) Prior Publication Data
US 2012/0198099 A1    Aug. 2, 2012

(30) Foreign Application Priority Data

Feb. 1, 2011    (KR) .................. 10-2011-0010035

(51) Int. Cl.
*G06F 13/38* (2006.01)
*G06F 3/00* (2006.01)
*G06F 13/10* (2006.01)
*G06F 9/4401* (2018.01)
*H04M 1/725* (2006.01)

(52) U.S. Cl.
CPC .......... *G06F 13/102* (2013.01); *G06F 9/4415* (2013.01); *H04M 1/72525* (2013.01); *H04M 1/72533* (2013.01)

(58) Field of Classification Search
None
See application file for complete search history.

(56) References Cited

U.S. PATENT DOCUMENTS

| 6,151,708 | A | * | 11/2000 | Pedrizetti | .................. | G06F 8/65 717/173 |
| 6,421,069 | B1 | | 7/2002 | Ludtke et al. | | |
| 8,176,481 | B2 | * | 5/2012 | Kasahara | .............. | G06F 9/5044 712/200 |
| 2002/0016166 | A1 | | 2/2002 | Uchida et al. | | |
| 2002/0095501 | A1 | | 7/2002 | Chiloyan et al. | | |
| 2003/0063608 | A1 | | 4/2003 | Moonen | | |

(Continued)

FOREIGN PATENT DOCUMENTS

| CN | 1565104 A | 1/2005 |
| CN | 101056206 A | 10/2007 |

(Continued)

OTHER PUBLICATIONS

International Search Report dated Sep. 27, 2012 in connection with International Patent Application No. PCT/KR2012/000551.

(Continued)

*Primary Examiner* — Idriss N Alrobaye
*Assistant Examiner* — Dayton Lewis-Taylor

(57) ABSTRACT

An apparatus and method install an application in a digital device. An apparatus for providing a connection program to a desired peripheral device in a digital device includes a communication unit for receiving system information from a peripheral device and transmitting a connection program list, a program detecting unit for analyzing the received system information and creating the connection program list executable in the peripheral device, and a control unit for transmitting the created connection program list to the peripheral device.

14 Claims, 10 Drawing Sheets

(56) References Cited

U.S. PATENT DOCUMENTS

| | | | |
|---|---|---|---|
| 2005/0114481 A1 | 5/2005 | Higuchi et al. | |
| 2005/0278418 A1* | 12/2005 | Rathakrishnan | G06F 8/67 709/203 |
| 2006/0265471 A1 | 11/2006 | Pitzel et al. | |
| 2007/0014314 A1 | 1/2007 | O'Neil | |
| 2007/0021067 A1 | 1/2007 | Kim et al. | |
| 2007/0093207 A1* | 4/2007 | Kim | 455/41.2 |
| 2007/0245347 A1 | 10/2007 | Oya et al. | |
| 2008/0091776 A1* | 4/2008 | Miyamoto | H04L 12/2809 709/203 |
| 2008/0155529 A1 | 6/2008 | Kang et al. | |
| 2008/0214172 A1* | 9/2008 | Anwer | 455/419 |
| 2008/0304408 A1 | 12/2008 | Kraemer et al. | |
| 2009/0259742 A1 | 10/2009 | Wong et al. | |
| 2010/0007618 A1* | 1/2010 | Park et al. | 345/173 |
| 2010/0262619 A1* | 10/2010 | Zargahi | G06F 8/61 707/770 |
| 2010/0298029 A1* | 11/2010 | Jang | 710/8 |
| 2011/0010703 A1 | 1/2011 | Matsuda | |
| 2011/0247013 A1* | 10/2011 | Feller et al. | 719/320 |
| 2011/0264739 A1 | 10/2011 | Wang et al. | |

FOREIGN PATENT DOCUMENTS

| | | |
|---|---|---|
| CN | 101346935 A | 1/2009 |
| CN | 101547206 A | 9/2009 |
| CN | 101557388 A | 10/2009 |
| CN | 101848416 | 9/2010 |
| CN | 101959179 | 1/2011 |
| CN | 101959179 A | 1/2011 |
| JP | H 11-282686 | 10/1999 |
| JP | 2001-287180 | 10/2001 |
| JP | 2002-169739 | 6/2002 |
| JP | 2002169739 A | 6/2002 |
| JP | 2005-122704 | 5/2005 |
| JP | 2009-211729 | 9/2009 |
| KR | 10-2005-0015925 | 2/2000 |
| KR | 1020010014271 A | 2/2001 |
| KR | 20070060957 A | 6/2007 |
| KR | 10-2007-0115084 | 12/2007 |
| KR | 1020080058888 A | 6/2008 |
| WO | WO 2011/007413 A1 | 1/2011 |

OTHER PUBLICATIONS

Written Opinion of the International Searching Authority dated Sep. 27, 2012 in connection with International Patent Application No. PCT/KR2012/000551.
English Translation and Chinese Office Action issued for CN201280007395.7 dated Nov. 25, 2015, 33 pgs.
Notice of Preliminary Rejection dated Feb. 29, 2016 in connection with Japanese Application No. 2013-551897, 7 pgs.
Notice of Final Rejection dated Aug. 22, 2016 in connection with Japanese Application No. 2013-551897, 6 pages.
Second Office Action dated Aug. 9, 2016 in connection with Chinese Application No. 201280007395.7, 44 pages.
Foreign Communication From a Related Counterpart Application, European Application No. 12742310.1, Extended European Search Report dated Mar. 22, 2017, 8 pages.
Foreign Communication From a Related Counterpart Application, Chinese Application No. 201280007395.7, The Third Office Action dated Jan. 11, 2017, 41 pages.
Notice of Preliminary Rejection dated Jun. 21, 2017 in connection with Korean Patent Application No. 10-2011-0010035.
Communication from a foreign patent office in a counterpart foreign application, Korean Intellectual Property Office, "Notice of Patent Grant," Korean Application No. 10-2011-0010035, dated Apr. 30, 2018, 4 pages.
Communication from a foreign patent office in a counterpart foreign application, European Patent Office, "Communication pursuant to Article 94(3) EPC," European Application No. EP 12742310.1, dated Mar. 14, 2018, 5 pages.

* cited by examiner

| 501 | 503 | 505 | 507 | 509 | 511 | 513 | 515 | 517 |
|---|---|---|---|---|---|---|---|---|
| O/S | SPECIFIC | CPU | RAM | INPUT TYPE | STRAGE SIZE | SENSOR | RESOLUTION | OTHERS |
| ANDROID VER 2.2 | GALAXY-S | 1K MIPS | 512MB | TOUCH PAD | 10MB | GPS, GEOMAGNETIC SENSOR | 1024x768 | MOUSE |
| | | | | H/W | | | | |

FIG.5

| NAME | O/S | VERSION | UNIQUE ID | URL | DESCRIPTION | SPECIFIC | H/W | | ... |
| --- | --- | --- | --- | --- | --- | --- | --- | --- | --- |
| | | | | | | | CPU | RAM | |
| SAMSUNG CONTROL | ANDROID VER 2.2 2.1 | 1.0 | 3DSSE | Http://down /*/*** | 1. TV CONTROL 2. PROGRAM INFORMATION ADDITION | GALAXY-S | 1K MIPS | 512MB | ... |
| SAMSUNG CONTROL | MOBILE WINDOW VER 7.0 | 1.0 | 3DSSE43 | Http://down /*/*** | 1. TV CONTROL 2. PROGRAM INFORMATION ADDITION | I-PHONE | 1K MIPS | 512MB | ... |
| SAMSUNG CONTROL | I-OS VER 4.0 4.2 | 1.0 | 3DSSE444 | Http://down /*/*** | 1. TV CONTROL 2. PROGRAM INFORMATION ADDITION | GENEAL | 1K MIPS | 512MB | ... |
| ... | | | | | | | | ... | |
| UNITED CONTROL | ANDROID VER 2.2 | 1.0 | 2ddfaca | Http://down /*/*** | TV CONTROL | GENEAL | 1K MIPS | 512MB | ... |
| UNITED CONTROL | MOBILE WINDOW VER 7.0 | 1.0 | 2dzvzcv | Http://down /*/*** | TV CONTROL | GENEAL | 1K MIPS | 512MB | ... |

FIG.6

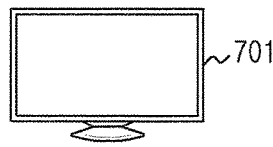
| APPLICATION | OS | APP VER | CPU | RAM | SPECIFIC |
|---|---|---|---|---|---|
| IR CONTROL | ANDROID VER 2.2 | 1.0 | MIPS | 512 | GALAXY S |
| TV CONTROL | W/M VER 7.0 | 1.0 | MIPS | 256 | MITS |
| SAMSUNG TV | ANDROID VER 2.2 | 1.0 | MIPS | 256 | GALAXY A |
| MOBILE MOUSE | BADA VER 1.0 | 1.0 | MIPS | 512 | - |
| CHANNEL CONTROL | IOS VER 4.0 | 1.0 | MIPS | 512 | IPHONE |
705 (bracket for table above)
| OS | CPU | RAM | SPECIFIC |
|---|---|---|---|
| ANDROID | MIPS | 512 | GALAXY S |
707
FIG.7A

APPARATUS AND METHOD FOR PROVIDING APPLICATION AUTO-INSTALL FUNCTION IN DIGITAL DEVICE

CROSS-REFERENCE TO RELATED APPLICATION(S) AND CLAIM OF PRIORITY

The present application is related to and claims priority under 35 U.S.C. § 119 to an application filed in the Korean Intellectual Property Office on Feb. 1, 2011 and assigned Serial No. 10-2011-0010035, the contents of which are incorporated herein by reference.

TECHNICAL FIELD OF THE INVENTION

The present disclosure relates generally to an apparatus and method for installing an application in a digital device, and in particular, to an apparatus and method for providing an auto-install function for automatically installing a connection (or association) application from a digital device to a peripheral device.

BACKGROUND OF THE INVENTION

Recently, the use of digital devices is rapidly increasing due to their portability, and service providers (terminal manufacturers) are competitively developing digital devices with more convenient functions in order to attract more users.

Examples of the digital devices include mobile communication terminals, smart phones, multimedia players, and portable games. The mobile communication terminals provide various functions such as phone book, game, schedulers, short message service, multimedia message service, broadcast message service, Internet service, e-mail, wake-up call, MP3 (MPEG Audio Layer-3), and digital camera.

In addition, recently, the digital device also provides a remote control function for connecting with a specific device and controlling the connected device. For example, the digital device can control media album play or volume in connection with an AV device.

The remote control function may be performed by connection with devices, and may control a device connected by a connection application.

Accordingly, in order to control a peripheral device by the digital device, a user must personally access an application providing site and download and install a remote control application in the digital device.

That is, a user of a digital device must access an application providing site, search/purchase a necessary application, and install the application in the digital device. However, this may inconvenience users that are not accustomed to a device control function.

What is therefore required is an apparatus and method for conveniently installing a necessary application in a digital device.

SUMMARY OF THE INVENTION

To address the above-discussed deficiencies of the prior art, it is a primary object to provide at least the advantages described below. Accordingly, an aspect of the present disclosure is to provide an apparatus and method for improving a connection performance with a peripheral device in a digital device.

Another aspect of the present disclosure is to provide an apparatus and method for providing a connection program from a digital device to a peripheral device.

Another aspect of the present disclosure is to provide an apparatus and method for classifying providable connection programs in a digital device by using system information of peripheral devices.

In accordance with an aspect of the present disclosure, an apparatus for providing a connection program from a digital device to a desired peripheral device includes: a communication unit for receiving system information from a peripheral device and transmitting a connection program list; a program detecting unit for analyzing the received system information and creating the connection program list executable in the peripheral device; and a control unit for transmitting the created connection program list to the peripheral device.

In accordance with another aspect of the present disclosure, an apparatus for installing a connection program in a digital device includes: a system information detecting unit for detecting, system information indicating a performance of a device; a communication unit for transmitting the system information to a desired peripheral device and receiving a connection program list; and a control unit for requesting, if update data is present among the received connection program list, update data from the peripheral device, receiving a connection program corresponding to the request, installing the received connection program and performing data update.

In accordance with another aspect of the present disclosure, a method for providing a connection program from a digital device to a desired peripheral device includes: receiving system information from a peripheral device; analyzing the received system information and creating a list of connection programs executable in the peripheral device; and transmitting the created connection program list to the peripheral device, wherein the system information is information indicating a performance of the peripheral device.

In accordance with another aspect of the present disclosure, a method for installing a connection program in a digital device includes: transmitting system information to a desired peripheral device and receiving a connection program list; determining whether update data is present among the received connection program list; if update data is present among the received connection program list, requesting and receiving update data from the peripheral device; and installing the received update data, wherein the system information is information indicating a performance of the device, and the update data is at least one of a connection program that is not installed in the device, and a connection program whose version is updatable.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be hound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspect, features and advantages of the present disclosure will become more apparent from the following detailed description when taken in conjunction with the accompanying drawings in which:

FIG. 5 illustrates a format of system information of a peripheral device according to an exemplary embodiment of the present disclosure;

FIG. 6 illustrates a format of application metadata information stored in a device providing a connection program according to an exemplary embodiment of the present disclosure;

FIG. 7A illustrates information stored by devices according to an exemplary embodiment of the present disclosure;

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure.

Exemplary embodiments of the present disclosure will be described herein below with reference to the accompanying drawings. In the following description, detailed descriptions of well-known functions or configurations will be omitted since they would unnecessarily obscure the subject matters of the present disclosure.

The present disclosure an apparatus and method for improving an inter-device connection performance by providing a connection program in a digital device by using system information of a peripheral device. The digital device means a device connectable with a different device, examples of which include computers, digital TVs, smart phones, printers, camcorders, and AV devices.

Figure 1:
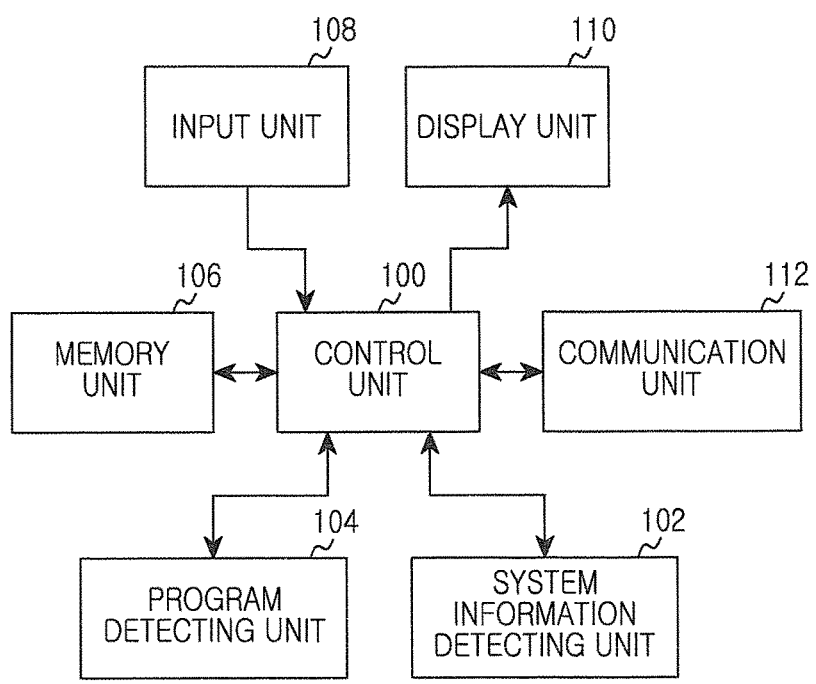
FIG. 1 illustrates a block diagram of a digital device providing an auto-install function according to an exemplary embodiment of the present disclosure.

FIG. 1 is a block diagram of a digital device providing an auto-install function according to an exemplary embodiment of the present disclosure.

Referring to FIG. 1, the digital device may include a control unit 100, a system information detecting unit 102, a program detecting unit 104, a memory unit 106, an input unit 108, a display unit 110, and a communication unit 112.

The control unit 100 controls an overall operation of the digital device. For example, the control unit 100 processes and controls voice communication and data communication. In addition to the general functions, according to the present disclosure, the control unit 100 performs a control function to provide an auto-install function. Herein, the auto-install function means a function for automatically installing a program for connection with a peripheral device.

The control unit 100 performs a different operation according to a function of the digital device. In the present disclosure, the control unit 100 is classified into a control unit of a device providing a device connection program (hereinafter referred to as 'connection program providing device') and a control unit of a device receiving a device connection program (hereinafter referred to as 'connection program receiving device').

The control unit 100 of the connection program providing device detects a device (a peripheral device) supporting an auto-install function through a device search process and a service search process, and classifies a connection program to be provided to the device, by using system information received from the device supporting an auto-install function. Also, the control unit 100 may include a function for receiving application metadata information connectable with a relevant device from an external server and updating the application metadata information in an up-to-date list.

When detecting the presence of a device supporting an auto-install function through a device search process and a service search process, the control unit 100 of the connection program receiving device transmits system information indicating its own performance and modem (e.g., Operating System (OS) platform, processer (CPU) information, memory (RAM) information (capacity), display resolution, input interface type, available storage size, sensor information, model name, and model number) to request a connection program corresponding to itself.

Under the control of the control unit 100, the system information detecting unit 102 detects system information indicating the performance of the device for reception of a device connection program and provides the same to the control unit 100. The system information detecting unit 102 operates when performing an operation for receiving the device connection program.

Under the control of the control unit 100, the program detecting unit 104 uses the received system information to classify a connection program executable in the device having provided the system. The program detecting unit 104 may compare the prestored application metadata information and the received system information to classify the connection program executable in the device having provided the system information. The program detecting unit 104 operates when performing an operation for providing the device connection program.

The memory unit 106 includes a ROM, a RAM and a flash ROM. The ROM stores various reference data and microcodes of programs for the process and control of the control unit 100, the system information detecting unit 102, and the program detecting unit 104.

The RAM is a working memory of the control unit 100, which stores temporary data that are generated during the execution of various programs. The flash ROM stores various updatable data such as phone book, outgoing messages, incoming messages, and user touch input points. In addition, the memory unit 106 stores system information and application metadata information according to the present disclosure. Also, the memory unit 106 may store device connection programs.

The input unit 108 includes numeric keys of digits 0-9 and a plurality of function keys, such as a Menu key, a Cancel (Delete) key, a Confirmation key, a Talk key, an End key, an Internet connection key, Navigation keys (or Direction keys), and character input keys. The input unit 108 provides the control unit 100 with key input data that corresponds to a key pressed by the user.

The display unit 110 displays numerals and characters, moving pictures, still pictures and status information generated during an operation of the digital device. According to the present disclosure, the display unit 110 may display a list of connectable devices and a list of device connection programs. The display unit 110 may be a color liquid crystal display (LCD) or an active-matrix organic light-emitting diode (AMOLED). If the display unit 110 has a touch input device and is applied to a touch input type portable terminal, the display unit 110 can be used as an input device.

The communication unit 112 transmits/receives Radio Frequency (RF) signals inputted/outputted through an antenna (not illustrated). For example, in a transmitting (TX) mode, the communication unit 112 channel-encodes, spreads and RF-processes TX data prior to transmission. In a receiving (RX) mode, the communication unit 112 converts a received RF signal into a baseband signal and despreads and channel-decodes the baseband signal to restore the original data. The communication unit 112 may support wired communication such as Ethernet. According to an exemplary embodiment of the present disclosure, the communication unit 112 may transmit device connection programs and system information.

The above configurations should be considered in descriptive sense only and not for the purpose of limitation, and those skilled in the art will understand that various changes may be made therein without departing from the scope of the present disclosure. For example, although separate units, such as the system information detecting unit 102 and the program detecting unit 104, are provided for respective functions of the control unit 100, the control unit 100 may be configured to also perform all or some of the respective functions on behalf of such separate units.

Figure 2:
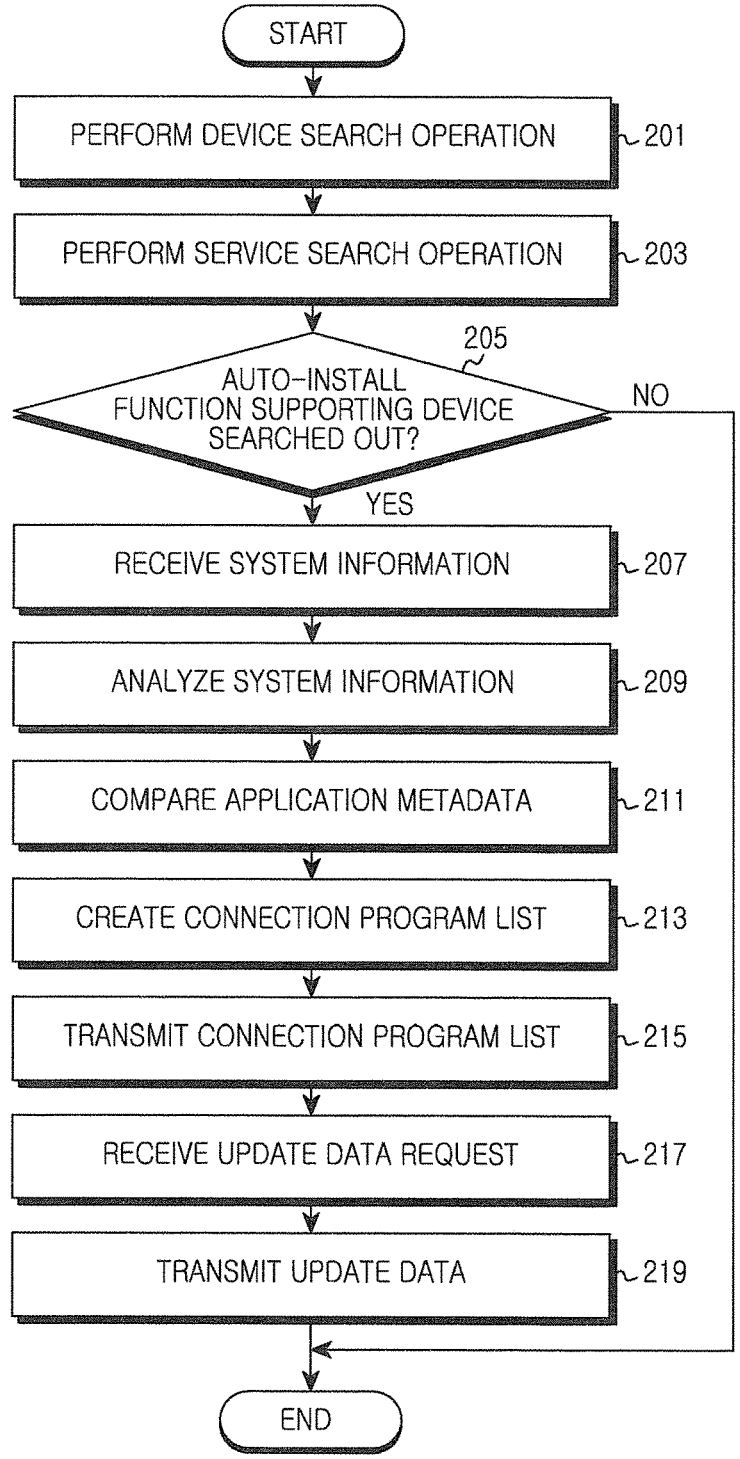
FIG. 2 illustrates a process for providing an auto-install function in a device according to an exemplary embodiment of the present disclosure.

FIG. 2 is a flow diagram illustrating a process for providing an auto-install function in a device according to an exemplary embodiment of the present disclosure.

Referring to FIG. 2, the device performs a device search operation on a peripheral device in step 201. In step 203, the device performs a service search operation on the peripheral device searched in the device search operation. For example, the device may use a universal plug and play (UPnP) service to perform the device search operation and the service search operation.

In step 205, the device determines whether a peripheral device supporting an auto-install function has been searched. Herein, the peripheral device supporting an auto-install function means a peripheral device that supports a function for automatically installing an application connectable with the device. The peripheral device supporting an auto-install function may receive an application from the device and install the received application, or may receive Universal Resource Locator (URL) information of a relevant application and download/install the relevant application.

If a peripheral device supporting an auto-install function has not been searched (in step 205), the device ends the algorithm of the present disclosure or communicates with a searched peripheral device.

On the other hand, if a peripheral device supporting an auto-install function has been searched (in step 205), the device proceeds to step 207. In step 207, the device receives system information from the peripheral device supporting an auto-install function. Herein, the system information may include OS platform, processor (CPU) information, memory (RAM) information (capacity), display resolution, input interface type, available storage size, sensor information, model name, and model number of the peripheral device supporting an auto-install function.

In step 209, the device analyzes the system information of the peripheral device received in step 207. In step 211, the device compares the system information of the peripheral device with the prestored application metadata information. Herein, the application metadata information may be metadata information of applications connectable with the device, and may include hardware (H/W) information and OS information required by applications.

In step 213, the device creates a connection program list.

Herein, the connection program means an application corresponding to the system information of the peripheral device, among the applications supported by the device. For example, the connection program may be an application that corresponds to an OS of the peripheral device and satisfies H/W conditions, among the RemCon applications corresponding to a plurality of OSs supported by the device.

In step 215, the device transmits the created connection program list to the peripheral device. In step 217, the device receives an update data request from the peripheral device. Herein, the update data means an application required by the peripheral device, among the connection program list received from the device.

In step 219, the device transmits update data requested from the peripheral device. Herein, the device may directly transmit the update data to the peripheral device, or may transmit the URL of a web storing the update data to allow the peripheral device to download the update data.

Thereafter, the device ends the algorithm of the present disclosure or performs the algorithm periodically or repeatedly.

Figure 3:
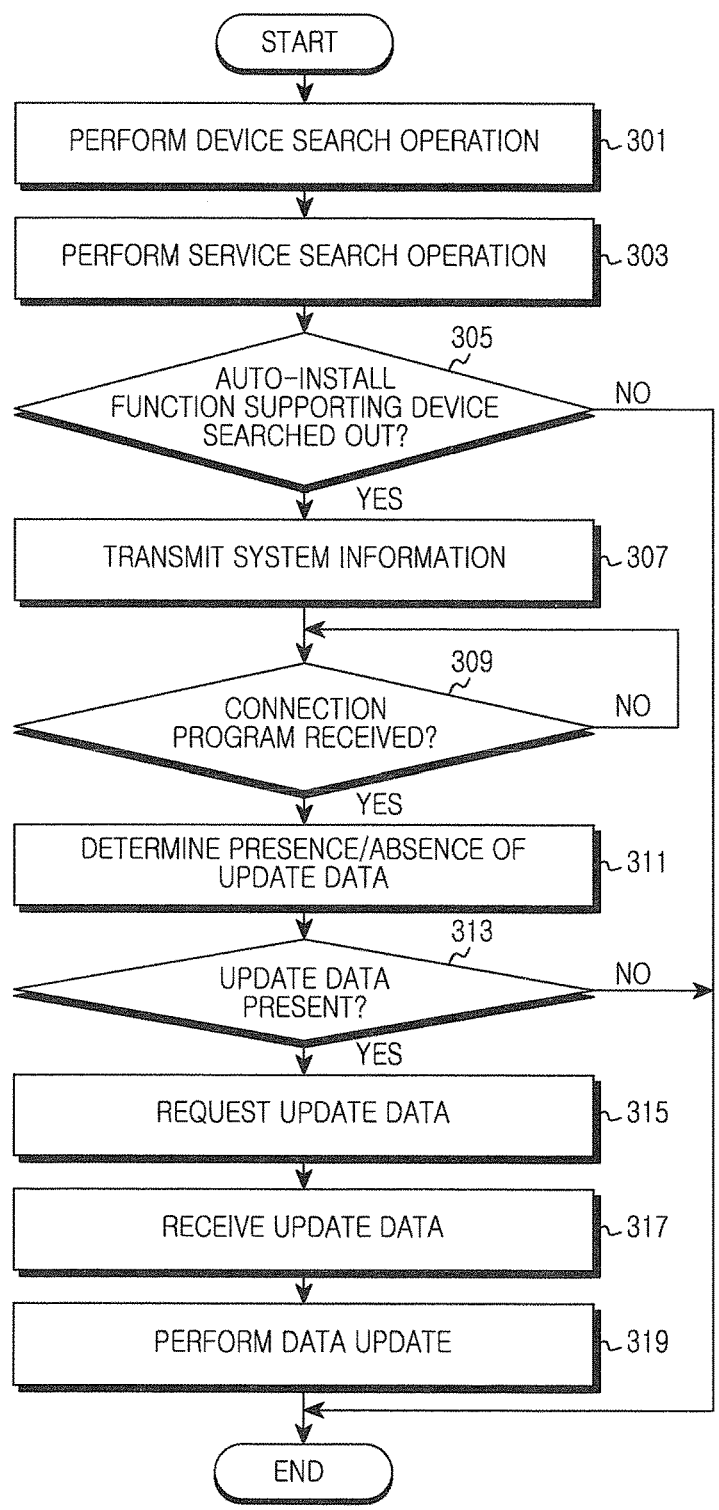
FIG. 3 illustrates a process for providing an auto-install function in a peripheral device according, to an exemplary embodiment of the present disclosure.

FIG. 3 is a flow diagram illustrating a process for providing an auto-install function in a peripheral device according to an exemplary embodiment of the present disclosure.

Referring to FIG. 3, the peripheral device performs a device search operation in step 301 and performs a service search operation in step 303. That is, the peripheral device transmits a response to the service search and the device search requested from a device.

In step 305, the peripheral device determines whether a device supporting an auto-install function has been searched. Herein, the device supporting an auto-install function means a device that supports a function for automatically installing an application connectable with the device.

If a device supporting an auto-install function has not been searched (in step 305), the device ends the algorithm of the present disclosure or performs the algorithm periodically or repeatedly.

On the other hand, if a device supporting an auto-install function has been searched (in step 305), the peripheral device proceeds to step 307. In step 307, the peripheral device transmits system information including its own OS information and H/W information to the device supporting an auto-install function. In step 309, the peripheral device determines whether a connection program list is received from the device.

If a connection program list is not received from the device (in step 309), the peripheral device repeats the operation of step 309.

On the other hand, if a connection program list is received from the device (in step 309), the peripheral device proceeds to step 311. In step 311, the peripheral device detects the presence of update data (application). In step 313, the peripheral device determines whether there is update date. Herein, the peripheral device determines whether a program required by the peripheral device is present among the received connection program list, or whether an update (e.g., version update) program is present among the pre-installed programs.

If there is no update data (in step 313), the peripheral device ends the algorithm of the present disclosure or performs the algorithm periodically or repeatedly.

On the other hand, if there is update data (in step 313), the peripheral device proceeds to step 315. In step 315, the peripheral device requests the update data (version update data or data to be newly installed) from the device. In step 317, the peripheral device receives the requested update data from the device.

In step 319, the peripheral device performs data update. Herein, if receiving file-type update data, the peripheral device may use the received update data to perform the data update. If receiving URL information of update data, the peripheral device may download the update data by the URL and perform the data update.

Thereafter, the peripheral device ends the algorithm of the present disclosure or performs the algorithm periodically or repeatedly.

Figure 4:
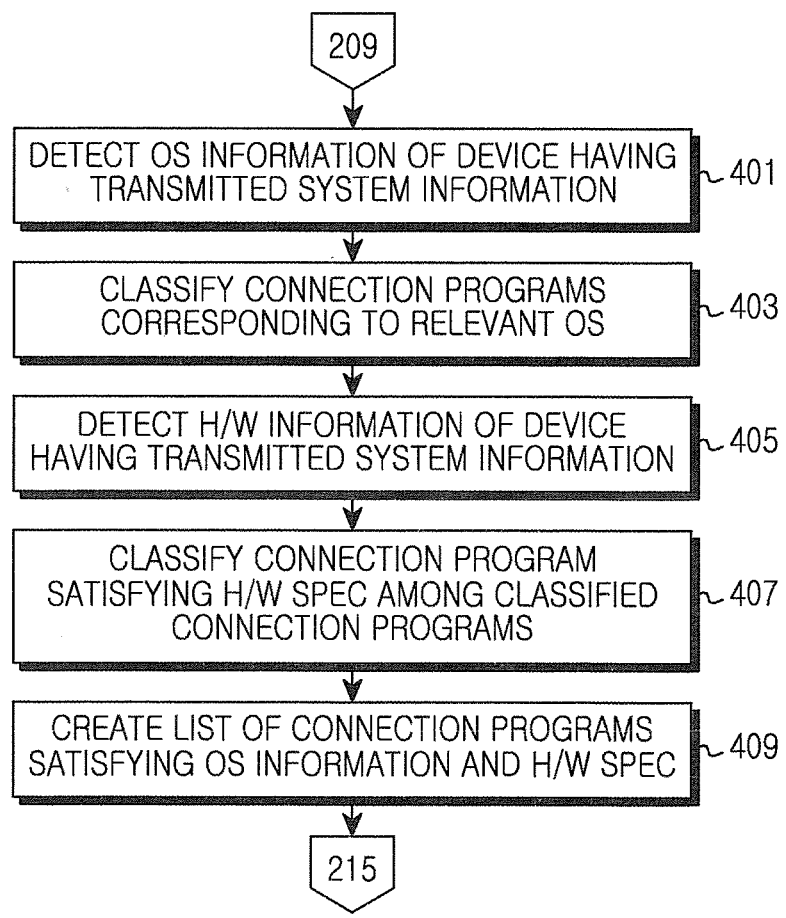
FIG. 4 illustrates a process for classifying connection programs, which will be provided to a peripheral device, in a device according to an exemplary embodiment of the present disclosure.

FIG. 4 is a flow diagram illustrating a process for classifying connection programs, which will be provided to the peripheral device, in the device according to an exemplary embodiment of the present disclosure.

Referring to FIG. 4, after receiving and analyzing system information from the peripheral device as in step 209 of FIG. 2, the device detects OS information of the peripheral device from the system information of the peripheral device in step 401.

In step 403, the device classifies a connection program corresponding to the detected OS information. Herein, the device detects the prestored application metadata information to classify the connection program corresponding to an application that supports the same OS as the peripheral device.

In step 405, the device detects H/W information of the peripheral device having transmitted the system information. In step 407, the device reclassifies the connection program satisfying the H/W spec of the peripheral device, among the connection programs classified in step 403. Herein, the device classifies the connection program executable in the peripheral device. That is, the device classifies the connection program requiring a H/W spec equal to or lower than the H/W spec of the peripheral device, among the pre-classified program.

In step 409, the device creates a list of connection programs satisfying the OS information and the H/W spec of the peripheral device. Thereafter, the device proceeds to step 215 of FIG. 2 to transmit the created connection program list to the peripheral device.

That is, the device can classify the program executable in the peripheral device by using the OS platform, processor (CPU) information, memory (RAM) information (capacity), display resolution, input interface type, available storage size, sensor information, model name, and model number of the peripheral device that are included in the system information.

FIG. 5 is a diagram illustrating a format of system information of a peripheral device according to an exemplary embodiment of the present disclosure.

Referring to FIG. 5, the peripheral device provides its own system information to a connection providing program device (i.e., a device providing a connection program) in order to receive a connection program executable in itself.

The system information includes OS information 501, modem name (specific) 503, H/W information, and an OS of a system information providing device. Herein, the H/W information may include processor information (CPU) 505, memory (RAM) information (capacity) 507, input interface type 509, available storage size 511, sensor information 513, display resolution 515, and other supporting functions 517.

That is, the system information is to notify the performance of a system information providing device. A device receiving the system information may compare the system information and the prestored application metadata information to detect a connection program executable in the peripheral device. Herein, the application metadata information means system information required by an application connectable with the device, which will be described below in detail with reference to FIG. 6.

It can be seen that a device having system information illustrated in FIG. 5 is a device corresponding to a Galaxy S model using an Android 2.2 version OS. In addition, it can be seen that the device is a device supporting a 1K MIPS processor, a 512 MB memory, a touch pad, a 10 MB storage memory, a GPS, a geomagnetic sensor, a 1074×768 resolution, and a mouse function.

Accordingly, the device, which receives system information and provides a connection program, detects a connection program corresponding to the performance of a device having provided the system information, and provides the connection program to the peripheral device.

Because the connection program is not executed in all OS and H/W performance even if the connection program is the same program, the device providing the connection program detects a connection program corresponding to the OS and the performance of the peripheral device. That is, even when a device using Android 2.2 version OS receives a connection program corresponding to a mobile window or a connection program corresponding to an Android version 1.1, the device cannot execute the received connection program.

FIG. 6 is a diagram illustrating a format of application metadata information stored in a device providing a connection program according to an exemplary embodiment of the present disclosure.

Referring to FIG. 6, the connection program providing device stores an application connectable with a peripheral device and metadata information about the application.

The metadata information about the application is information about a peripheral device required by an application. The metadata information about the application may include application name 601, application execution OS and OS version information 603, application version information 605, application unique ID 607, application URL information 609, application function and operation description 611, application support model information 613, and application execution H/W information 615.

As illustrated in FIG. 6, it can be seen that the device is a device storing an application capable of controlling Samsung products (Samsung Control) 620 and an application capable of controlling devices in a unified manner (Unified Control) 630.

However, the application is not executable in all devices, and a distributed application varies according to the H/W performance and the OS (version) of a relevant device. That is, an application corresponding to Apple OS (I-OS) or Window Mobile (W/M) cannot be executed in a device using an Android OS. Also, even an application corresponding to an Android OS cannot be executed if OS version information required by the application differs.

Accordingly, the device stores an application performing the same function, in accordance with a plurality of OS (version) and H/W performances. That is, in order to detect a connection program (a connection application) suitable for a peripheral device, the device stores an application (Samsung Control) 620 capable of controlling Samsung products that are executable in an Android 2.2 version, an Android 2.1 version, a mobile window 7.0 version, an I-OS 4.0 version and an I-OS 4.2 version, and stores an application (Unified Control) 630 capable of controlling devices in an unified manner, which are executable in executable in an Android 2.2 version and a mobile window 7.0 version.

For example, if receiving system information indicating the use of an Android OS 2.2 version from a peripheral device, the device detects an application capable of controlling Samsung products (Samsung Control) suitable for the Android OS 2.2 version and an application capable of controlling devices in a unified manner (Unified Control), and provides the same to the peripheral device. If receiving system information indicating the use of an Android OS 2.1 version from a peripheral device, the device detects an application capable of controlling Samsung products (Samsung Control) suitable for the Android OS 2.1 version, and provides the same to the peripheral device.

In this example, the device may directly provide the detected application to the peripheral device, or may transmit URL information for downloading the detected application to the peripheral device, so that the peripheral device directly downloads the application and then installs the same.

FIG. 7 is a diagram illustrating an operation process of an auto-install function according to an exemplary embodiment of the present disclosure.

In the following description, the devices may be classified into a connection program providing device and a connection program receiving device (a peripheral device). According to an exemplary embodiment of the present disclosure, the connection program providing device is defined as a TV and the connection program receiving device is defined as a smart phone.

FIG. 7A is a diagram illustrating information stored by devices according to an exemplary embodiment of the present disclosure.

Referring to FIG. 7A, the device TV 701 stores metadata information 705 about an application connectable with peripheral devices.

As illustrated in FIG. 7A, the device TV 701 may connect with a peripheral device through an infrared (IR) control application, a TV control application, a Samsung TV application, a mobile mouse application, and a channel control application. In addition to the applications, the device TV 701 stores metadata information indicating application execution OS information and version information, control processor information, memory information, and model mane information.

The device smart phone 703 system information 707 indicating an Galaxy S that uses an Android 2.2 version OS and has a 1K MIPS control processor and a 512 MB memory.

Figure 7B:
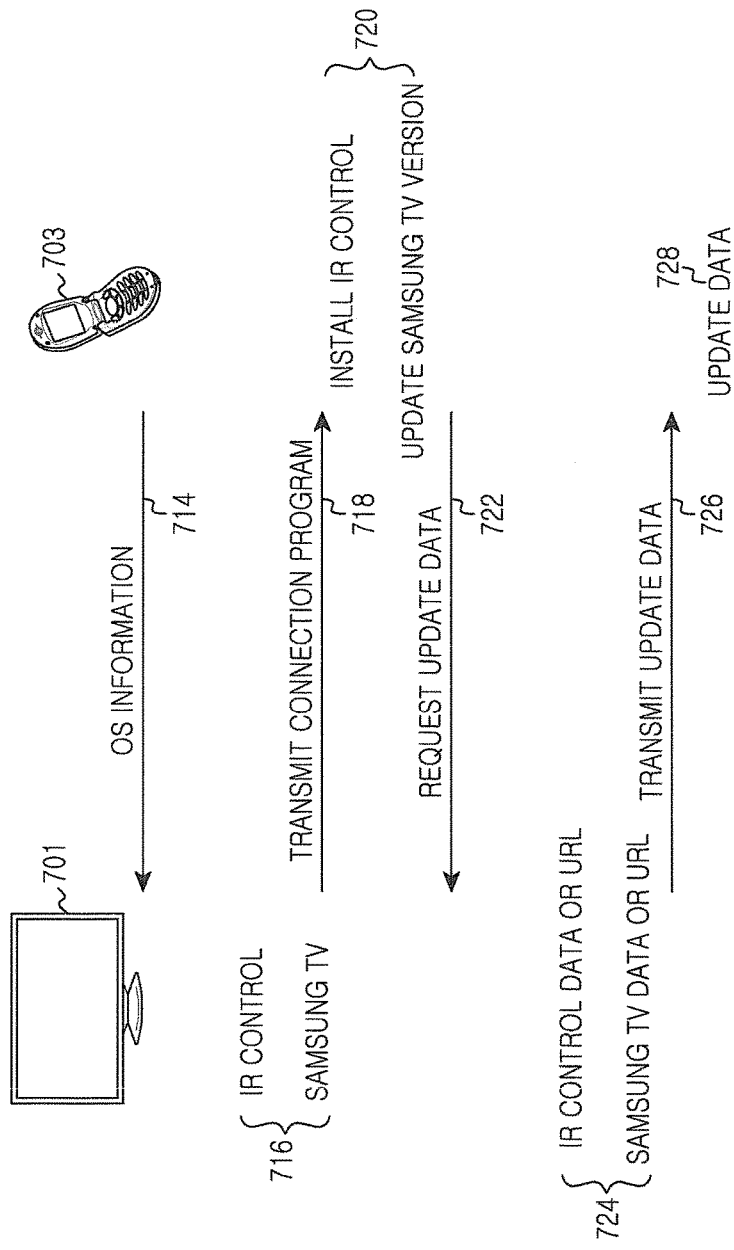
FIG. 7B illustrates a process for providing a connection program in a device according to an exemplary embodiment of the present disclosure.

FIG. 7B is a flow diagram illustrating a process for providing a connection program in a device according to an exemplary embodiment of the present disclosure.

Referring to FIG. 7B, a device TV 701 and a device smart phone 703 detects that an auto-install function can be used through a device search process and a service search process.

If the devices detect that an auto-install function can be used, the device smart phone 703 provides OS information among system information to the device TV 701 (714).

Accordingly, the device TV 701 may detect that the device smart phone 703 uses an Android OS, and classify an IR control application and a Samsung TV application as a connection program corresponding to the Android OS (716). The device TV 701 may detect OS version information of the device smart phone 703 and classify an application executable in the relevant version OS.

After classifying the connection program, the device TV 701 provides information about the classified connection program (e.g., application name and version) to the device smart phone 703 (718). Upon receiving the information, the device smart phone 703 uses the information to determine whether to update the connection program. That is, the device smart phone 703 may determine whether it is necessary to install the connection program or update the version.

If an IR control application is not installed in the device smart phone 703 and an older-version Samsung TV application is installed therein, the device smart phone 712 determines that it is necessary to install the IR control application and update the version of the Samsung TV application (720).

Accordingly, the device smart phone 703 request data update to the device TV 701 (722). Upon receiving the request, the device TV 701 provides the device smart phone 703 with an application 724 or an URL of an application (i.e., an application store address) corresponding to the update data (726). That is, as illustrated in FIG. 7B, the device TV 701 provides the device smart phone 703 with an IR control application and a Samsung TV application or application download URL information.

Accordingly, by using the application received from the device TV 701, the device smart phone 703 installs an IR control application and updates the version of a Samsung TV application (728).

If receiving URL information of a relevant application from the device TV 710, the device smart phone 703 downloads the relevant application by the received URL, installs an IR control application, and updates the version of a Samsung TV application.

Figure 7C:
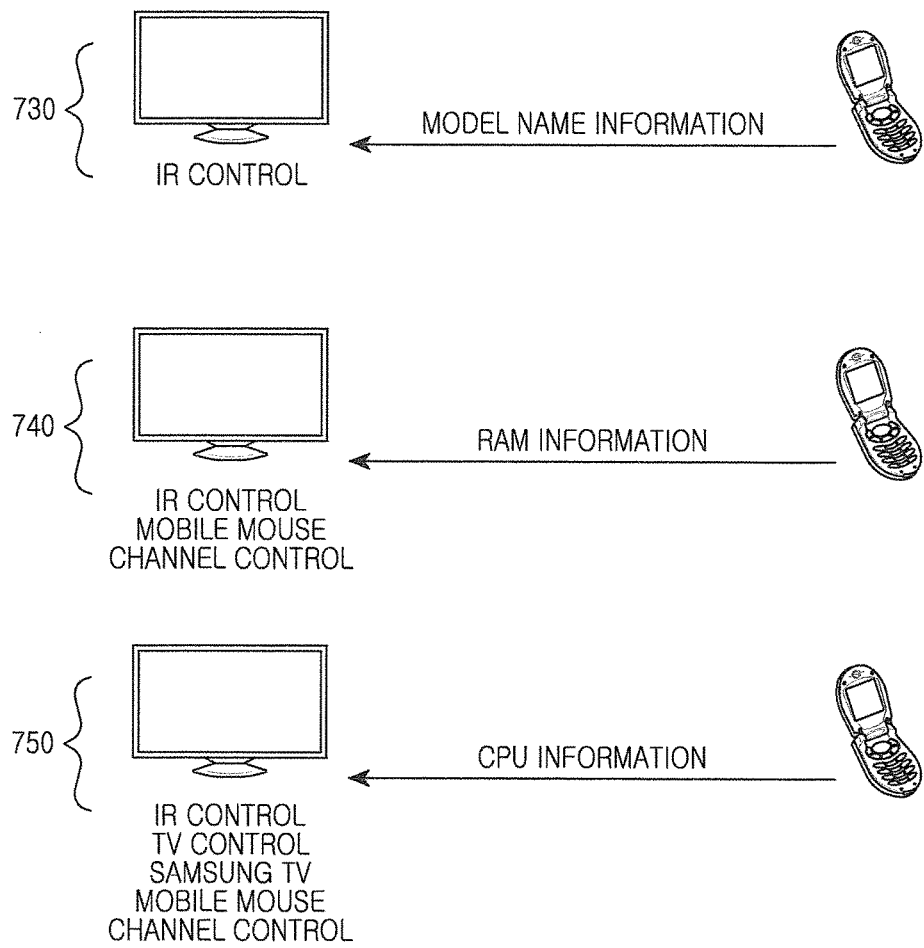
FIG. 7C illustrates a process for classifying connection programs in a device according to an exemplary embodiment of the present disclosure.

FIG. 7C is a flow diagram illustrating a process for classifying connection programs in a device according to an exemplary embodiment of the present disclosure.

Referring to FIG. 7C, the device TV may classify connection programs by using the prestored application metadata information and the system information received from the device smart phone.

That is, if receiving system information including a model name 'Galaxy S' from the device smart phone, the device TV detects metadata information stored as in FIG. 7A, and detects an IR control application by a connection program (application) executable through the Galaxy S (730).

Also, if receiving system information including '512' memory information from the device smart phone, the device TV detects metadata information stored as in FIG. 7A, and detects an IR control application, a mobile mouse application and a channel control application by a connection program requiring less than 512 Mb memory (740).

In addition, if receiving system information including '1K MIPS' control processor information from the device smart phone, the device TV detects metadata information stored as in FIG. 7A, and detects an IR control application, a TV control application, a Samsung TV application, a mobile mouse application and a channel control application by a connection program required by the processor (750).

Because the connection program detected by the device TV corresponds to a different OS, the device smart phone may directly classify an association (or connection) application suitable for itself.

Figure 8:
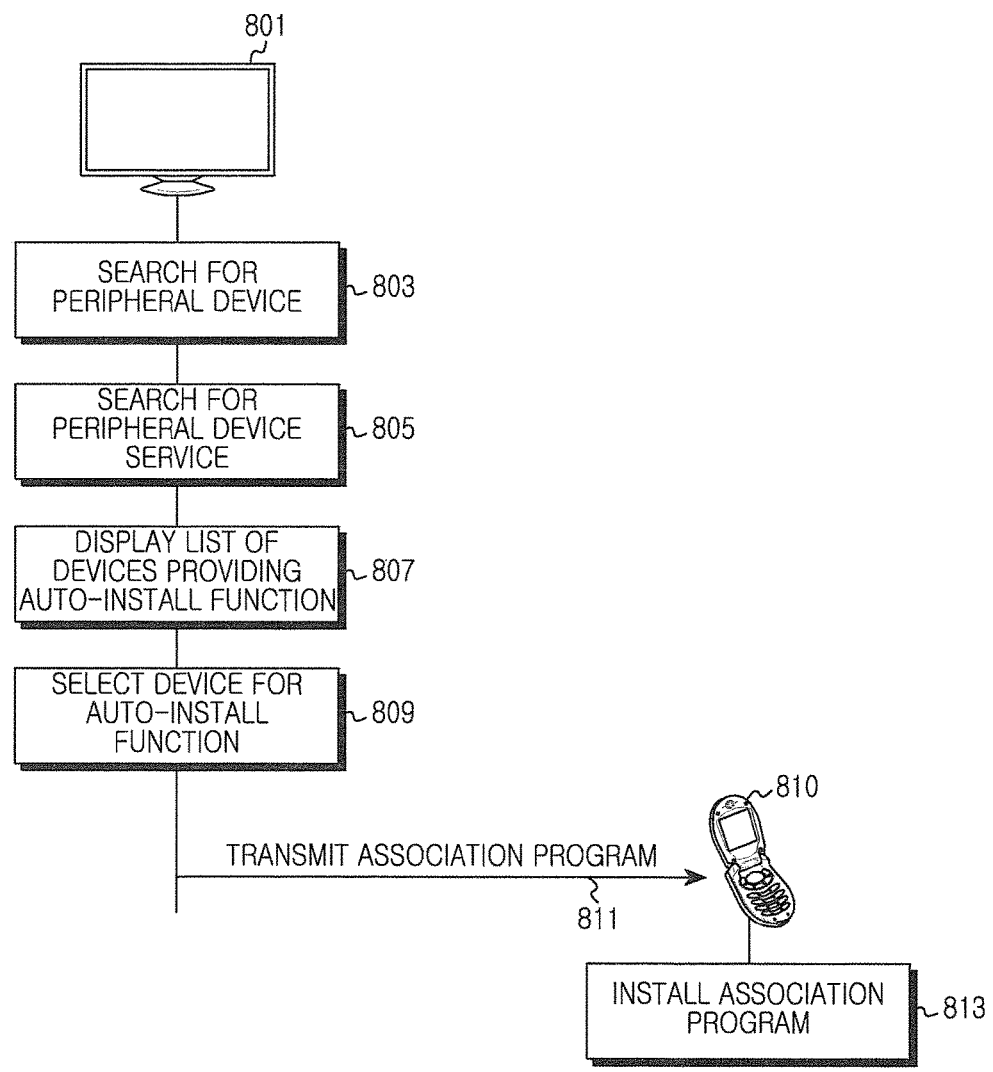
FIG. 8 illustrates a process for providing an auto-install function in a device according to an exemplary embodiment of the present disclosure.

FIG. 8 is a flow diagram illustrating a process for providing an auto-install function in a device according to an exemplary embodiment of the present disclosure.

Referring to FIG. 8, the device (e.g., TV) 801 performs a peripheral device search operation in step 803. In step 805, the device 801 performs a service search operation on the peripheral device searched in step 803. For example, the device 801 may use an UPnP service to perform the peripheral device search and the service search.

In step 807, the device 801 searches a peripheral device providing an auto-install function and displays a list of devices providing an auto-install function. In step 809, the device 801 receives a selection of a device for an auto-install function from a user.

In step 811, the device 801 transmits the connection program to the selected device (e.g., smart phone) 810. In step 813, the device 810 receives the connection program and installs the received connection program.

As described above, the present disclosure is to improve a connection performance with a peripheral device in a digital device. The digital device uses system information of the peripheral device to provide a connection program, thereby making it possible to conveniently install a device connection application.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present disclosure.

What is claimed is:

1. A first electronic device comprising:
a communication unit; and
a display;
a controller configured to:
   search for at least one second electronic device supporting an auto-install function, the at least one second electronic device including a processor, a memory and a second communication unit, the at least one second electronic device being distinct from the first electronic device;
   display, on the display, a list of electronic devices supporting the auto-install function, the list including the searched for at least one second electronic device;
   receive, a user input for selecting a second electronic device from the list;
   analyze a system information of the selected second electronic device received from the selected second electronic device, the system information of the selected second electronic device associated with a performance characteristic of the selected second electronic device;
   create a connection program list comprising at least one connection program installable in the selected second electronic device by comparing the system information and a plurality of prestored application metadata information stored in the first electronic device;
   control the communication unit to transmit the connection program list to the selected second electronic device; and
   in response to receiving, via the communication unit, a request for at least one update data from the connection program list, from the selected second electronic device, control the communication unit to transmit the requested update data to the selected second electronic device,
wherein when the connection program is installed in the selected second electronic device, the selected second electronic device is capable of controlling the first electronic device using the connection program installed in the selected second electronic device,
wherein the first electronic device is a TV, and
wherein the connection program comprises a program for changing a channel of the first electronic device.

2. The first electronic device of claim 1, wherein the plurality of prestored application metadata information stored in the first electronic device includes at least one of Operating System (OS) information, OS version information, and hardware (H/W) information required by each application, and
the system information includes at least one of OS platform, processor information, memory information, display resolution, input interface type, available storage size, sensor information, model name, and model number.

3. The first electronic device of claim 1, further comprising:
a memory unit configured to store the plurality of the prestored application metadata information,
wherein the controller is further configured to control the communication unit to directly transmit the requested update data or a Universal Resource Locator (URL) for downloading the requested update data.

4. The first electronic device of claim 1, wherein the selected second electronic device is a mobile terminal,
wherein the selected second electronic device automatically installs the requested update data transmitted by the first electronic device and executes the installed update data.

5. A second electronic device comprising:
a communication unit configured to transmit a system information of the second electronic device to a first electronic device, the system information of the second electronic device associated with a performance characteristic of the second electronic device, the second electronic device being distinct from the first electronic device, and receive, from the first electronic device, a connection program list comprising at least one connection program installable in the second electronic device, and
a controller configured to:

request, via the communication unit, at least one of update data among the connection program list to the first electronic device, receive, the requested update data from the first electronic device, wherein the communication unit, in response to searching by the first electronic device, is configured to transmit a signal that the second electronic device is able to support an auto-install function, wherein the second electronic device is an electronic device selected, based on a user input of the first electronic device, from at least one electronic device searched for by the first electronic device wherein when the connection program is installed in the second electronic device, the second electronic device is capable of controlling the first electronic device using the connection program installed in the second electronic device, wherein the first electronic device is a TV, and wherein the connection program comprises a program for changing a channel of the first electronic device.

6. The second electronic device of claim 5, wherein the controller is further configured to directly receive the requested update data or a URL for downloading the requested update data, wherein when receiving an URL for downloading the requested update data, the controller is further configured to access the URL to download the requested update data.

7. The second electronic device of claim 5, wherein the second electronic device is a mobile terminal and wherein the first electronic device is a digital television, wherein the second electronic device installs the requested update data automatically and executes the installed update data.

8. A method for operating a first electronic device, the method comprising:

searching for at least one second electronic device supporting an auto-install function, the at least one second electronic device including a processor, a memory and a second communication unit, the at least one second electronic device being distinct from the first electronic device;

displaying, on a display of the first electronic device, a list of electronic devices supporting the auto-install function, the list including the searched for at least one second electronic device;

receiving, a user input for selecting a second electronic device from the list;

analyzing a system information of the selected second electronic device from the selected second electronic device, the system information of the selected second electronic device associated with a performance characteristic of the selected second electronic device;

creating a connection program list comprising at least one connection programs installable in the selected second electronic device by comparing the system information and a plurality of prestored application metadata information stored in the first electronic device;

transmitting the created connection program list to the selected second electronic device; and in response to receiving a request for at least one update data from the connection program list, from the selected second electronic device, transmitting the requested update data to the selected second electronic device, wherein when the connection program is installed in the selected second electronic device, the selected second electronic device is capable of controlling the first electronic device using the connection program installed in the selected second electronic device, wherein the first electronic device a TV, and wherein the connection program comprises a program for changing a channel of the first electronic device.

9. The method of claim 8, wherein the plurality of prestored application metadata information includes at least one of Operating System (OS) information, OS version information, and hardware (H/W) information required by each application, and wherein the system information includes at least one of OS platform, processor information, memory information, display resolution, input interface type, available storage size, sensor information, model name, and model number.

10. The method of claim 8, wherein transmitting the requested update data comprises:

directly transmitting the requested update data or a Universal Resource Locator (URL) for downloading the requested update data.

11. The method of claim 8, wherein the selected second electronic device is a mobile terminal, wherein the selected second electronic device automatically installs the requested update data transmitted by the first electronic device and executes the installed update data.

12. A method in a second electronic device, the method comprising:

in response to searching by a first device, transmitting a signal that the second device is able to support an auto-install function;

transmitting system information of the second electronic device to a first electronic device, the system information of the second electronic device associated with a performance characteristic of the second electronic device, and receiving, from the first electronic device, a connection program list comprising at least one connection program installable in the second electronic device;

requesting at least one of update data among the connection program list to the first electronic device; and receiving the requested update data from the first electronic device wherein the second electronic device is an electronic device selected, based on a user input of the first electronic device, from at least one electronic device searched for by the first electronic device, wherein when the connection program is installed in the second electronic device, the second electronic device is capable of controlling the first electronic device using the connection program installed in the second electronic device, wherein the first electronic device is a TV, and wherein the connection program comprises a program for changing a channel of the first electronic device.

13. The method of claim 12, wherein receiving the requested update data comprises:

directly receiving the requested update data or a Universal Resource Locator (URL) for downloading the requested update data, wherein the method further comprises:

accessing, when receiving an URL for downloading the requested update data, the URL to download the requested update data.

14. The method of claim 12, wherein the second electronic device is a mobile terminal and wherein the first electronic device is a digital television,
wherein the selected second electronic device installs the requested update data automatically and executes the installed update data.

* * * * *